US010668751B2

(12) United States Patent
Marchesin et al.

(10) Patent No.: US 10,668,751 B2
(45) Date of Patent: Jun. 2, 2020

(54) PRINTING SYSTEM FOR PRINTING A PLURALITY OF IMAGES ON A FIRST WEB AND ON A SECOND WEB AND A METHOD THEREOF

(71) Applicant: Océ Holding B.V., Venlo (NL)

(72) Inventors: Laurent J. F. D. Marchesin, Venlo (NL); Larry Juton, Venlo (NL)

(73) Assignee: CANON PRODUCTION PRINTING HOLDING B.V., Venlo (NL)

(*) Notice: Subject to any disclaimer, the term of this patent is extended or adjusted under 35 U.S.C. 154(b) by 0 days.

(21) Appl. No.: 16/359,697

(22) Filed: Mar. 20, 2019

(65) Prior Publication Data

US 2019/0217640 A1 Jul. 18, 2019

Related U.S. Application Data

(63) Continuation of application No. PCT/EP2017/073282, filed on Sep. 15, 2017.

(30) Foreign Application Priority Data

Sep. 28, 2016 (EP) .................................... 16191075

(51) Int. Cl.
*B41J 15/22* (2006.01)
*B65H 16/08* (2006.01)
(Continued)

(52) U.S. Cl.
CPC ............... *B41J 15/22* (2013.01); *B65H 26/08* (2013.01); *G06K 15/022* (2013.01);
(Continued)

(58) Field of Classification Search
CPC ......... B41J 15/18–24; B65H 26/00–08; B65H 2301/11; B65H 2301/41284;
(Continued)

(56) References Cited

U.S. PATENT DOCUMENTS 6,120,142 A * 9/2000 Eltgen ...................... B41J 3/60
242/615.12
8,240,843 B2 * 8/2012 Ray .......................... B41J 2/155
156/504
(Continued)

FOREIGN PATENT DOCUMENTS

EP  2 923 845 A1  9/2015

OTHER PUBLICATIONS

International Search Report, issued in PCT/EP2017/073282, dated Nov. 22, 2017.
(Continued)

*Primary Examiner* — Nguyen Q. Ha
(74) *Attorney, Agent, or Firm* — Birch, Stewart, Kolasch & Birch, LLP

(57) ABSTRACT

A printing system and a method for printing a plurality of images on a first web and on a second web are disclosed. The printing system includes a print head, a feed unit for feeding both the first web and the second web simultaneously to the print head in a feed direction relative the print head, a wrap up unit for wrapping up both the first web and the second web simultaneously to form a first output roll and a second output roll respectively, a user interface configured to set a printing arrangement of the plurality of images on the first web and the second web and to input the print head, the feed unit and the wrap up unit for performing printing according to the printing arrangement by ejecting marking material on the respective webs. The printing system includes a prediction module for predicting a first diameter of the first output roll and a second diameter of the second output roll based on the printing arrangement. The prediction module is configured to establish a difference of the predicted first diameter and the predicted second diameter, and to provide to the user
(Continued)

interface a warning when the established difference is larger than a predetermined diameter difference threshold.

10 Claims, 4 Drawing Sheets

(51) Int. Cl.
  *G06K 15/02* (2006.01)
  *B65H 26/08* (2006.01)
(52) U.S. Cl.
  CPC ............... *B65H 2301/11* (2013.01); *B65H 2301/41284* (2013.01); *B65H 2301/41398* (2013.01); *B65H 2801/15* (2013.01)
(58) Field of Classification Search
  CPC ...... B65H 2301/41398; B65H 2801/15; G03G 21/14; G06K 15/00; G06K 15/02; G06K 15/022; G06K 15/16
  See application file for complete search history.

(56) References Cited

U.S. PATENT DOCUMENTS

| | | |
|---|---|---|
| 2004/0022568 A1 | 2/2004 | Menendez et al. |
| 2008/0226376 A1* | 9/2008 | Monteith ............... B41J 3/4075 400/613 |
| 2011/0261393 A1 | 10/2011 | Lemoine |
| 2015/0278649 A1* | 10/2015 | Yoshiwaka ............ G06K 15/16 358/1.12 |
| 2019/0114124 A1* | 4/2019 | Tremblay .............. G06F 3/1219 |

OTHER PUBLICATIONS

Written Opinion of the International Searching Authority, issued in PCT/EP2017/073282, dated Nov. 22, 2017.

* cited by examiner

PRINTING SYSTEM FOR PRINTING A PLURALITY OF IMAGES ON A FIRST WEB AND ON A SECOND WEB AND A METHOD THEREOF

CROSS REFERENCE TO RELATED APPLICATIONS

This application is a Continuation of PCT International Application No. PCT/EP2017/073282, filed on Sep. 15, 2017, which claims priority under 35 U.S.C. 119(a) to Patent Application No. 16191075.7, filed in Europe on Sep. 28, 2016, all of which are hereby expressly incorporated by reference into the present application.

FIELD OF THE INVENTION

The invention is in the field of printing systems for printing a plurality of images on a first web and on a second web simultaneously when said webs are fed to a printer head. It further relates to the field of methods for printing a plurality of images on both the first web and the second web simultaneously.

BACKGROUND OF THE INVENTION

Printing systems for printing a plurality of images on a first web and on a second web are known in the art. The printing systems comprise a print head and feed means for feeding simultaneously the first web and the second web to the print head in a feed direction. The printing systems also comprise a user interface that allows an operator to arrange the plurality of figures in a printing arrangement. In the printing arrangement the images of said plurality are arranged adjacent to each other along the feed direction on the first web and the second web to set printing. In general, the printing arrangement can be seen in a display screen of the user interface. Then, said user interface inputs the print head and the feed means to perform printing on the first web and the second web according to the printing arrangement as said webs are leaded to the print head.

In order to save web, the plurality of images are usually arranged in both webs close to each other along the feed direction. The print head is configured to eject marking material like ink or toner on the first and second web according to the printing arrangement. The images to be printed are distributed between the first and second web. While the images scheduled for the first web and the images scheduled for the second web are printed by means of the marking material ejection on the respective webs, the first web and the second web are rolled up to establish a first output roll and a second output roll. Cores of the first and second output roll may be attached to a same axis of the printing system. In that case and also for other cases of post-processing of the first and second output roll, it is desired or even obligatory that a diameter of the first output roll and a diameter of the second output roll are approximately the same.

It is an object of the present invention to achieve a first output roll and a second output roll of approximately the same diameter.

DETAILED DESCRIPTION OF THE INVENTION

To this end, a first aspect of the invention relates to a printing system for printing a plurality of images on a first web and on a second web, the printing system comprising:

a) a print head;
b) a feed unit for feeding both the first web and the second web from a first input roll and a second input roll respectively simultaneously to the print head in a feed direction relative said print head;
c) a wrap up unit for wrapping up both the first web and the second web simultaneously to form a first output roll and a second output roll respectively;
d) a user interface configured to set a printing arrangement of the plurality of images on the first web and the second web and to input the print head, the feed unit and the wrap up unit for performing printing according to the printing arrangement by ejecting marking material on the respective webs;

wherein the printing system further comprises a prediction module for predicting before the start of printing a first diameter of the first output roll and a second diameter of the second output roll based on the printing arrangement, the prediction module being configured to establish a difference of the predicted first diameter and the predicted second diameter, and to provide to the user interface a warning when the established difference is larger than a predetermined diameter difference threshold.

In this way, the printing system allows for an easy and error-free wrapping up of the first and second web by the wrap up unit and/or an easy and error free off line post processing of the first and second output roll.

In order to accurately predict the diameters of the first and second output roll, the prediction module receives data of the printing system configuration like system settings, printing strategies, print modes, data regarding properties of the first web and the second web, data regarding properties of the cores used to wrap up the first and second web, data regarding the marking material ejection, for example ink drop size, ink drop frequency, coverage degree, and image data regarding image size in pixels and the pixel values of the images to be printed.

The predetermined diameter difference threshold is for example predetermined by the printing system capabilities and constraints with respect to the wrap up unit and by a printing speed to be used by the printing system when printing on the first and second web.

The prediction module of the invention is also configured to cooperate with the user interface to input the print head, the feed unit and the wrap up unit according to the printing arrangement.

It is important to be noted that the printing system may be a printer as known in the art, such as a roll to roll printer, further comprising the prediction module. The prediction module may be attached to the printer or in signal communication with it. The prediction module may comprise a hardware device, a software program, an electronic circuit or combinations thereof for displaying the plurality of printing arrangements and for cooperating with the user interface to change printing arrangement and to start and stop printing.

In an embodiment, the display screen is arranged in a touch-screen for allowing touch-selection of the printing arrangement from a plurality of printing arrangements. In this way, one printing arrangement can be easily selected.

In an embodiment, the images in a printing arrangement are capable of being moved relative to the displayed webs of the printing arrangement whose printing is not yet started for a change of the printing arrangement. In this way, the printing system provides a change in a printing arrangement in a more simple way. Further, the display screen may be smaller.

According to an embodiment the prediction module is configured to predict the first diameter and the second diameter at any scheduled moment in time before printing on the first web and the second web and to establish the difference at any scheduled moment in time before printing on the first web and the second web. A scheduled moment in time is scheduled in the printing arrangement as a moment in time when at least a part of the first web and at least a part of the second web is printed upon. The predicted diameters may be calculated each time a planning of images is modified or a status of a web changes or a status of an output roll changes.

According to an embodiment the predetermined diameter difference threshold is dependent from the scheduled moment in time of printing on the first web and the second web. The threshold may increase when a larger part of the webs become printed. This is taken into account when predicting the diameters beforehand by the prediction module for the webs during printing.

According to an embodiment the printing system comprises a scheduling module to create the printing arrangement which comprises a distribution of the images to be printed over the first web and the second web. The scheduling module allows the printing system to react automatically. If no scheduling module is present, the printing system would just stop and ask the user via the user interface to either confirm he wants to continue anyway or to cancel pending print jobs of images intended to be printed.

According to an embodiment the scheduling module comprises an image mover for moving an image in the printing arrangement to be printed on the second web instead of to be printed on the first web or vice versa. The image mover may be incorporated in a software component, hardware component or a combination thereof.

According to a further embodiment the image mover is configured to automatically initiate at least one moving action when the difference between the first diameter of the first output roll and the second diameter of the second output roll is larger than the predetermined diameter difference threshold in order to establish a difference between the first diameter of the first output roll and the second diameter of the second output roll which is smaller than the predetermined diameter difference threshold.

The second aspect of the invention relates to a method for printing a plurality of images with a printing system comprising a print head, the method comprising the steps of setting an arrangement of the plurality of images on the first web and the second web in a printing arrangement, feeding simultaneously the first web and the second web from a first input roll and a second input roll respectively to the print head in a feed direction relative to said print head for performing printing according to the printing arrangement, wrapping up simultaneously the first web and the second web on a first output roll and a second output roll respectively, wherein the printing system further comprises a prediction module for predicting a first diameter of the first output roll and a second diameter of the second output roll based on the printing arrangement, and the method comprises the steps of establishing a difference of the first diameter and the second diameter predicted by the prediction module, and providing a warning when the established difference is larger than a predetermined diameter difference threshold.

Finally, a third aspect of the invention relates to a non-transitory recording medium comprising computer-executable program code configured to instruct a prediction module of a printing system as described above and/or a computer to perform a method as described above.

BRIEF DESCRIPTION OF THE DRAWINGS

For the purpose of illustrating the invention, the drawings show aspects of one or more embodiments of said invention. However, it should be understood that the present invention is not limited to the precise arrangements and instrumentalities shown in the drawings, wherein.

DETAILED DESCRIPTION OF THE DRAWINGS

It should be noted that items which have the same reference numbers in different figures, have the same structural features and the same functions. Where the function and/or structure of such an item has been explained, there is no necessity for repeated explanation thereof in the detailed description.

It should be noted that the above-mentioned embodiments illustrate rather than limit the invention, and that those skilled in the art will be able to design many alternative embodiments.

Figure 1:
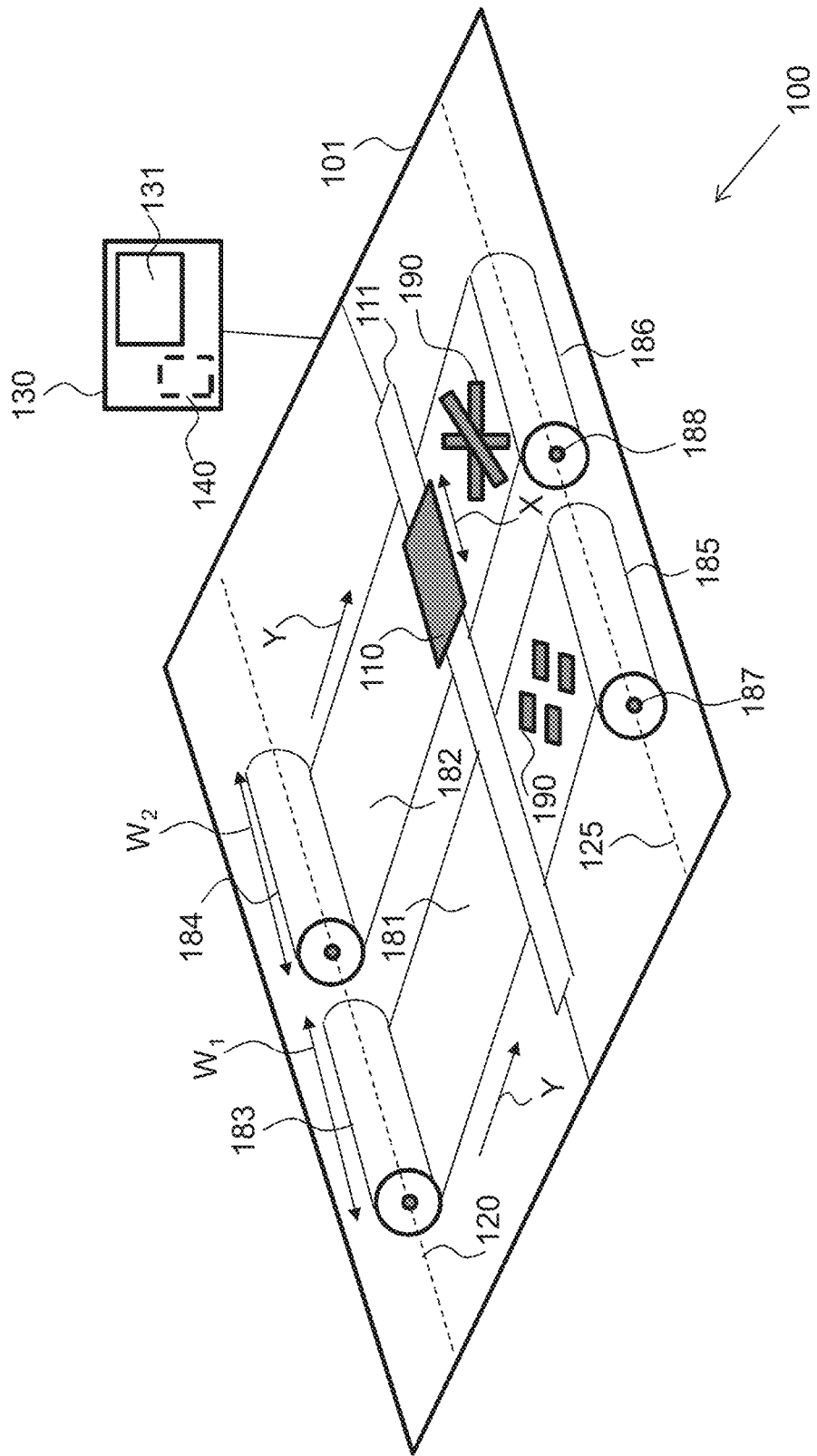
FIG. 1 is a schematic view of a printing system according to the invention.

FIG. 1 depicts a schematic view of a printing system 100 according to an example of the invention. The printing system 100 comprises a roll-to-roll printer 101 comprising a print head 110, a feed unit 120, and a wrap unit 125. The printing system 100 also comprises a user interface 130 having a display screen 131. The display screen 131 may be touch-sensitive to facilitate operator actions at the display screen 131. The printing system 100 further comprises a prediction module 140 arranged within the user interface 130 of the roll-to-roll printer 101. It is important to note that in a more specific example, the user interface 130 and the prediction module 140 may be arranged in a separated module detached but in signal communication with the printing system 100.

The feed unit 120 are arranged to transport a first web 181 and a second web 182, in the present example from a first paper roll 183 and a second paper roll 184 respectively. The first paper roll 183 has a first width $W_1$ and the second paper roll 184 has a second width $W_2$ as indicated by the double-sided arrows in FIG. 1. The first width $W_1$ may be equal to the second width $W_2$ but may also be different in size. The first web 181 and the second web 182 are fed to the print head 110 in a feed direction Y shown by an arrow depicted in FIG. 1.

Then, by movement of the print head 110 along a gantry 111 in a bi-direction X perpendicular to the feed direction Y, a plurality of images 190 can be printed on both the first web 181 and the second web 182 simultaneously.

Then, the first web 181 and the second web 182 are fed to the wrap up unit 125 in order to be wrapped up to form a first output roll 185 and a second output roll 186 respectively. The first output roll 185 has a first core 187 and the second output roll 186 has a second core 188. It is noted that the first output roll 185 has a width $W_1$ and the second output roll 186 has a width $W_2$ due to the widths $W_1$, $W_2$ of the input rolls 183, 184 respectively.

The printing system 100 allows for arrangement of the plurality of images 190. An operator of the printing system 100 may decide the order and distribution of the plurality of images 190 on the first web 181 and the second web 182 in a printing arrangement. In the present example, the printing arrangement is set by the operator via the user interface 130 or automatically set by a control unit (not shown) of the printing system in order to optimally use and save web media. Then, the user interface 130 inputs the print head 110, the feed unit 120 and the wrap unit 125 according to the printing arrangement to perform printing of the plurality of images 190.

Figure 2:
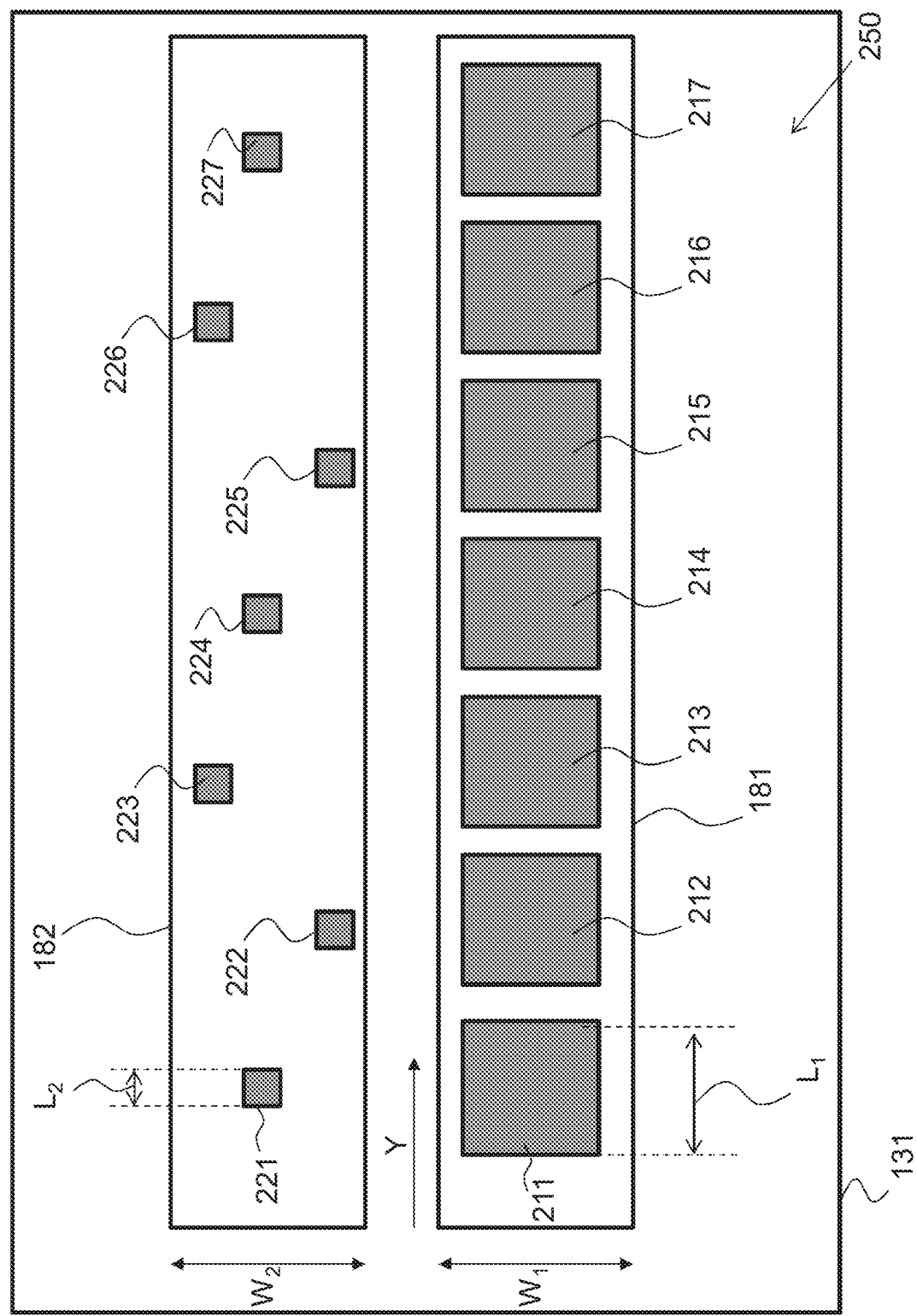
FIG. 2 is a first printing arrangement of a plurality of images to be printed as displayed on the user interface of the printing system depicted in FIG. 1.

As a mode of example, FIG. 2 shows an example of a printing arrangement 250 for printing images 211-217, 221-227 of the plurality 190. The printing arrangement 250 is displayed in the display screen 131 of the user interface 130 showing the order and distribution of said plurality of images on the first web 181 and the second web 182.

In the example of the invention, the images 211-217, 221-227 are square images. The images 211-217 are positioned on the first web 181 and each image has a side of size $L_1$. The images 221-227 are positioned on the second web 182 and each image has a side of size $L_2$, which is approximately equal to $\frac{1}{3}*L_1$. Square images are displayed for convenience reasons to explain the principle of the invention but other images may also be printed on the webs 181, 182.

A coverage is defined as the size of an area of the web covered by marking material divided by the size of a web part corresponding with the locations of the images to be printed. For example, the coverage of the images 211-217 on the first web 181 is approximately equal to 9 times the coverage of the images 221-227 on the second web 182.

The width $W_1$ of the first web 181 and the width $W_2$ of the second web 182 are assumed to be equal in size, but other sizes may be envisioned. Lengths of the webs 181, 182 in the Y direction are assumed to be equal. Thicknesses of the webs 181, 182 in a direction perpendicular to FIG. 2 are assumed to be equal, for example 0.1 mm. A marking material layer thickness on the webs 181, 182 is assumed to be equal, for example 0.001 mm. It is assumed that the skilled person may refine the assumption of the marking material layer thickness to be dependent on a selected print mode of the printing system, a selected ink drop size, and the color distribution in the image to be printed, the print resolution, etc.

By using the thickness of the first web 181, the length of the first web 181 and the width $W_1$, a volume of the first input roll 183 can be calculated. From the volume of the first input roll 183 and a diameter of a core of the first input roll 183 a diameter of the first input roll 183 may be derived by elementary calculations. Since the first web 181 and the second web 182 wrap up forming a spiral object calculations which are more dedicated to spirals may be envisioned. By also using the coverage of the images 211-217 and the thickness of the marking material layer on the first web 181 a volume of the marking material on the first web 181 can be calculated. By adding the volume of the first input roll 183 to the volume of the marking material on the first web 181 and estimation of a volume of the first output roll 185 may be derived. From the volume of the first output roll 185, the width $W_1$ of the first output roll 185 and a diameter of the core 187 of the first output roll 185 a diameter of the first output roll 185 may be derived by elementary calculations.

A similar exercise may be done for the second web 182 leading to an estimation of the diameter of the second output roll 186.

According to another embodiment, when printing on both webs 181, 182, the print quality can only be guaranteed when both input rolls have nearly the same diameter and both output rolls have nearly the same diameter. The user can make sure input rolls have the same diameter. The printing system can automatically balance print jobs that have to be printed in order to eject a same amount of ink on both output rolls 185, 186. Since the printing system knows the planning (list of pending images for each roll with their exact location), the amount of marking material that is needed to print each image, each of the output rolls diameters, an average thickness of a layer of marking material, a diameter of each output roll can be calculated in advance after each planned image to be printed using elementary mathematical formulas.

According to the method of the invention a difference between the estimation of the diameter of the first output roll 185 and the estimation of the diameter of the second output roll 186 is then compared to a predetermined diameter difference threshold according to the invention. If the difference is larger than the threshold, a warning by means of the user interface is displayed in order to warn an operator of the printing system according to the invention.

Other steps for estimating the diameter of the first output roll 185 and the diameter of the second output roll 186 may be envisioned and fall under the scope of the claimed invention. Also, another approach addressing only marking material amounts to be ejected may be used. For example, a first marking material amount to be ejected on the first web 181 may be compared to the second marking material amount to be ejected on the second web 182 taking into account the widths $W_1$, $W_2$ and cores 187, 188 of the first and second output roll 185, 186 respectively, if different. A quotient or difference of the amounts may be compared with a predetermined threshold tuned for marking material amounts in order to warn the operator in case of a non-admissible value for the quotient or difference respectively.

As soon as the images 211-217 and the images 221-227 are scheduled on the first web 181 and the second web 182 respectively, the calculations mentioned here-before may be executed by the prediction module 140 of the printing system 100 according to the invention.

According to an embodiment the prediction module 140 is configured to predict the first diameter and the second diameter at any scheduled moment in time during printing on the first web 181 and the second web 182 and to establish the difference at any scheduled moment in time during printing on the first web 181 and the second web 182 before the actual printing. FIG. 2 shows at least a part of the webs 181, 182, so the calculations may be performed for a length unit—for example for each meter—of the length of the webs 181, 182. This is advantageous, since when the difference is larger than the threshold at an arbitrary sub-length of the length of the webs 181, 182, this may also lead to wrapping up errors by the wrapping up unit 125.

According to an embodiment the predetermined diameter difference threshold is dependent in scheduled time of printing on the first web 181 and the second web 182. This means that the threshold may be different for each calculation at a certain sub-length of the webs 181, 182. The threshold may for example be defined as increasing from the beginning of wrapping up of the webs 181, 182 towards the end of the wrapping up of the webs 181, 182 by means of the wrapping up unit 125.

According to an embodiment the printing system comprises a scheduling module to create the printing arrangement 250 which comprises a distribution of the images 190 to be printed over the first web 181 and the second web 182.

According to a further embodiment the scheduling module comprises an image mover for moving an image in the printing arrangement 250 to be printed on the second web 182 instead of to be printed on the first web 181 or vice versa. The image mover may be configured to automatically initiate at least one moving action when the difference in diameter of the first output roll 185 and the diameter of the second output roll 186 is larger than the predetermined diameter difference threshold in order to establish a difference in diameter of the first output roll 185 and the diameter of the second output roll 186 which is smaller than the predetermined diameter difference threshold.

Figure 3:
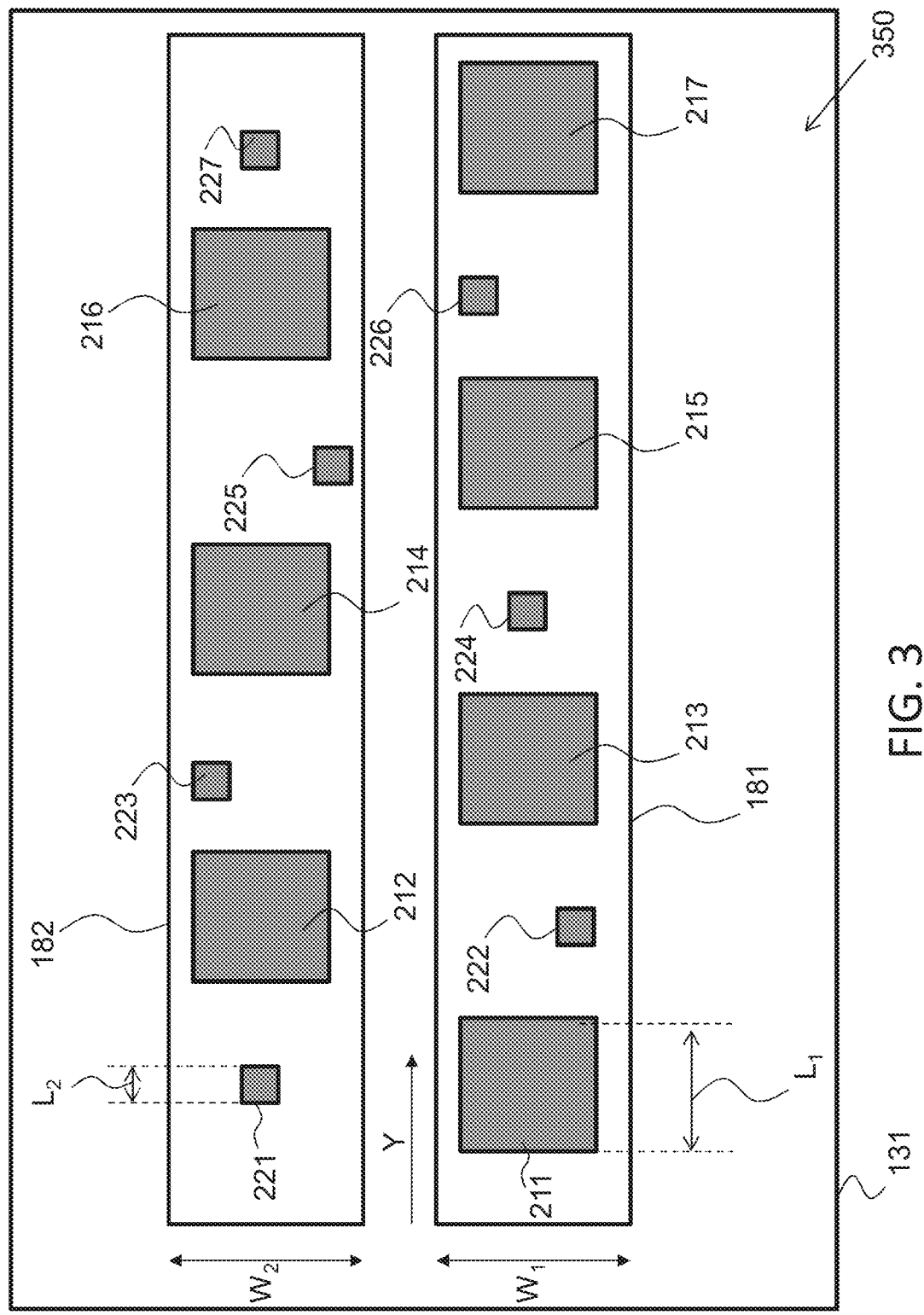
FIG. 3 is a second printing arrangement displayed by the user interface of the printing system depicted in FIG. 1.

As a mode of example, the printing arrangement 250 may lead to a difference in diameters that is larger than the threshold. The image mover may than swap the images 222, 224, 226 on the second web 182 with the images 212, 214, 216 on the first web 181 respectively. The end result of this swap action is a printing arrangement 350 as shown in FIG. 3. Other moves of the images may be envisioned. After each move by the image mover the prediction module 140 may perform the calculations in order to update values for the diameter of the first output roll 185 and the diameter of the second output roll 186. The updated values are shown at the screen 131 of the user interface 130 of the printing system 100 according to the invention. The moves may continue—manually by the operator by means of the user interface screen 130 or automatically by the image mover—until the diameter difference is smaller than the threshold.

A move of an image or a swap of two images must not affect the image position requirements input by the user. For example, if the user asked to print an image left aligned, the image may be rotated by 180 degrees, i.e. $\pi$ radians, when moved to the other output roll.

Figure 4:
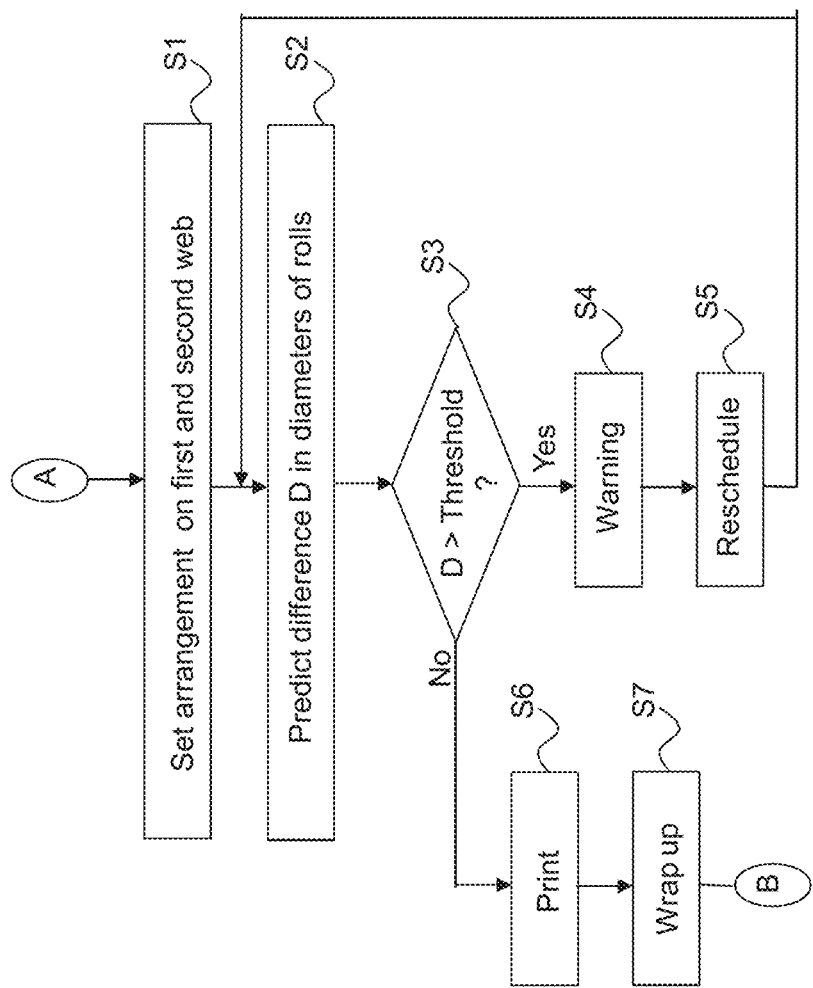
FIG. 4 is a flow diagram of an embodiment of the method according to the invention.

FIG. 4 is a flow diagram of an embodiment of the method according to the invention. The method leads from a starting point A to a first step S1.

In the first step S1 an arrangement of the plurality of images 190 on the first web 181 and the second web 182 is set in a printing arrangement 250. This may be achieved by a scheduler being part of a control unit like a computer with RAM and ROM—automatically or manually via the user interface 130 of the printing system 100 according to the invention.

In a second step S2 a difference of a diameter of the first output roll 185 and a diameter of the second output roll 186 is predicted by the prediction module according to the invention based on the current printing arrangement 250.

In a third step S3 it is checked if the established difference is larger than a predetermined diameter difference threshold. If so, the method proceeds to a fourth step S4. If not so, the method proceeds to a sixth step S6.

In the fourth step S4 a warning is provided when the established difference is larger than the predetermined diameter difference threshold. According to a more automated embodiment, the fourth step S4 is skipped and a fifth step S5 is executed automatically.

In the fifth step S5 at least one image is scheduled to be printed on the second web 182 instead of on the first web 181 or vice versa leading to a new printing arrangement, for example the printing arrangement 350 in FIG. 3. The method returns to the second step S2.

In a sixth step S6 the first web 181 and the second web 182 are simultaneously fed to the print head 110 in a feed direction Y relative to said print head 110 for performing printing according to the current printing arrangement.

In a seventh step S7 the first web 181 and the second web 182 are simultaneously wrapped up on the first output roll 185 and the second output roll 186 respectively. By doing so, the difference in diameter of the wrapped up rolls 185, 186 is smaller than the predetermined diameter difference threshold. The sixth step S6 and the seventh step S7 are executed simultaneously. The printed web part is guided to the wrap unit for wrapping up the printed part of the web.

The method ends in an endpoint B.

The invention claimed is:

1. A printing system for printing a plurality of images on a first web and on a second web, the printing system comprising:
   a print head;
   a feed unit for feeding both the first web and the second web from a first input roll and a second input roll respectively simultaneously to the print head in a feed direction relative to said print head;
   a wrap up unit for wrapping up both the first web and the second web simultaneously to form a first output roll and a second output roll respectively;
   a user interface configured to set a printing arrangement of the plurality of images on the first web and the second web and to input the print head, the feed unit and the wrap up unit for performing printing according to the printing arrangement by ejecting marking material on the respective webs; and
   a prediction module for predicting before the start of printing a first diameter of the first output roll and a second diameter of the second output roll based on the printing arrangement, the prediction module being configured to establish a difference of the predicted first diameter and the predicted second diameter, and to provide to the user interface a warning when the established difference is larger than a predetermined diameter difference threshold.

2. The printing system according to claim 1, wherein the prediction module is configured to predict the first diameter and the second diameter at any scheduled moment in time before printing on the first web and the second web and to establish the difference at any scheduled moment in time before printing on the first web and the second web.

3. The printing system according to claim 2, wherein the predetermined diameter difference threshold is dependent from the scheduled moment in time of printing on the first web and the second web.

4. The printing system according to claim 1, wherein the printing system comprises a scheduling module to create the printing arrangement which comprises a distribution of the images to be printed over the first web and the second web.

5. The printing system according to claim 4, wherein the scheduling module comprises an image mover for moving an image in the printing arrangement to be printed on the second web instead of to be printed on the first web or vice versa.

6. The printing system according to claim 5, wherein the image mover is configured to automatically initiate at least one moving action when the difference between the first diameter of the first output roll and the second diameter of the second output roll is larger than the predetermined diameter difference threshold in order to establish a difference between the first diameter of the first output roll and the second diameter of the second output roll which is smaller than the predetermined diameter difference threshold.

7. The printing system according to claim 2, wherein the printing system comprises a scheduling module to create the printing arrangement which comprises a distribution of the images to be printed over the first web and the second web.

8. The printing system according to claim 3, wherein the printing system comprises a scheduling module to create the printing arrangement which comprises a distribution of the images to be printed over the first web and the second web.

9. A method for printing a plurality of images with a printing system comprising a print head, the method comprising the steps of:

setting an arrangement of the plurality of images on the first web and the second web in a printing arrangement;

feeding simultaneously the first web and the second web from a first input roll and a second input roll respectively to the print head in a feed direction relative to said print head for performing printing according to the printing arrangement;

wrapping up simultaneously the first web and the second web on a first output roll and a second output roll respectively, wherein the printing system further comprises a prediction module for predicting a first diameter of the first output roll and a second diameter of the second output roll based on the printing arrangement, and the method comprises the steps of establishing a difference of the first diameter and the second diameter predicted by the prediction module; and providing a warning when the established difference is larger than a predetermined diameter difference threshold.

10. A non-transitory recording medium comprising computer-executable program code configured to instruct a prediction module of a printing system and a computer to perform the method according to claim 9.

* * * * *